METHOD AND APPARATUS FOR SUPERFINISHING RING RACEWAYS

Filed April 18, 1960 5 Sheets-Sheet 1

Inventor
Joseph W. Serafin
By Zabel, Baker, York, Jones and Dithmar
Attorneys

May 14, 1963 J. W. SERAFIN 3,089,289

METHOD AND APPARATUS FOR SUPERFINISHING RING RACEWAYS

Filed April 18, 1960 5 Sheets-Sheet 2

Inventor.
Joseph W. Serafin
By Zabel, Baker, York, Jones and Dithmar
Attorneys

May 14, 1963 J. W. SERAFIN 3,089,289

METHOD AND APPARATUS FOR SUPERFINISHING RING RACEWAYS

Filed April 18, 1960 5 Sheets-Sheet 3

Inventor
Joseph W. Serafin
By Zabel, Baker, York, Jones and Dithmar
Attorneys

Inventor
Joseph W. Serafin
By Zabel, Baker, York, Jones and Dithmar
Attorneys

May 14, 1963 J. W. SERAFIN 3,089,289

METHOD AND APPARATUS FOR SUPERFINISHING RING RACEWAYS

Filed April 18, 1960 5 Sheets-Sheet 5

Inventor
Joseph W. Serafin
By Zabel, Baker, York, Jones and Dithmar
Attorneys

United States Patent Office 3,089,289
Patented May 14, 1963

3,089,289

METHOD AND APPARATUS FOR SUPER-FINISHING RING RACEWAYS

Joseph W. Serafin, 6314 S. Troy St., Chicago, Ill.
Filed Apr. 18, 1960, Ser. No. 23,098
23 Claims. (Cl. 51—58)

This invention relates to a method of superfinishing ground internal and external raceways on a ring and to apparatus for practicing the method.

The principal object of this invention is to superfinish bearing raceways on rings uniformly in equal lengths of time and without inspection. The grinding art on ring raceways is able to machine produce ring raceways, both internal and external, having a smoothness in the range of 12 to 15 micro inches. The surface of these ground raceways under a microscope shows sharp peaks and valleys, which, however, are spaced too far apart to provide a surface of long wear and low noise and heat for ball bearings. They should be finished to a smoothness of about 3 micro inches. This may be done by using a finer abrasive, i.e., emery cloth after a polishing operation with a stone. At the present time, it is done in this fashion, a stone having its work surface contoured to both the cross section and the circular curvature of the raceway is pressed against the raceway which is rotated in accordance with standard centerless grinding practice. Additionally, the stone is oscillated at right angles to the median plane of the raceway at irregular intervals until inspection of the surface shows that the best possible finish is reached.

The present invention provides a method of utilizing these steps of rotating the ring and oscillating the stone, or other abrasive, to provide a desired superfinish with the stone alone in a minimum period of time within a three micro-inch range of smoothness and without inspection at the end of the operation. The first feature of the method is varying uniformly the speed of rotation of the ring, and the rate of oscillation of the abrasive. More specifically, applicant initially rotates the ring at a speed of about 10 r.p.m., and in the period of 27 seconds, for example, accelerates the rotation up to 900 r.p.m. Since a fine finish is attained by contacting the maximum number of points on the surface of the stone with the maximum number of points on the surface of the raceway, acceleration of the speed of rotation of the ring will tend to effect this.

The second important step in the method is to oscillate the stone at either uniform periods or at uniformly lengthening periods. Applicant may start the oscillation of the abrasive, i.e., stone, at 500 per minute and during 30 seconds steadily slow this rate to 20 per minute. Bearing in mind that the stone wears the raceway, but the raceway also erodes the stone, it is evident that toward the end of polishing, the lines of engagement tend more and more to be parallel to the median line of the raceway.

Another step of the method is holding the ring against the drive rollers solely by means of the stone riding in the raceway, that is, without lateral support, and this, irrespective of different rotating and oscillating speeds of the ring and stone respectively. As the stone and raceway contour themselves to each other, they produce a truer track than would occur where the ring itself is held.

An important step in the method is resetting the stone in its holder after each finishing operation. This resetting is done accurately and makes possible the principal steps of finishing while holding the ring merely by the stone in the raceway of the ring.

The remaining objects of this invention relate to a machine for practicing the method. The first apparatus object is to provide means for automatically positioning a ring on a drive means, of engaging a stone against the raceway to be finished, of finishing it, and then removing the stone and the ring.

A second object is to reset the stone in its holder after each cycle. The stone oscillates around a center lying in the median plane of the raceway, and since the stone wears during each finishing operation, it should be reset in its holder to obtain optimum correct radial length. A feature of this invention is a means for positioning of a stone reset gauge immediately adjacent the finishing zone, together with means for checking the stone against the reset gauge afer each finishing operation. The stone is loosened in its holder, pressed by a spring into the gauge, re-tightened, and then applied to the raceway of the next ring.

The invention includes several improvements: (1) a head carrying a finishing stone which moves into and out of the internal raceway of a ring while remaining capable of oscillating movement in gravity engagement with the raceway; (2) a feeding mechanism capable of picking up rings of various diameters and thicknesses, and with the raceway located internally, externally, or both; (3) a ring ejector which temporarily positions a ring for engagement by the polishing stone and then withdraws so that the stone and the ring may freely adjust themselves to each other; (4) a base carriage that may be positioned so that the work head may engage external as well as internal raceways of a ring; and (5) the entire finishing mechanism may be moved away from the finishing zone for purposes of setup, testing, repair and cleaning.

These and such other objects as may hereinafter appear are attained in the embodiment hereinafter described in association with the accompanying drawings, wherein.

*The Function of the Machine*

Figure 1:
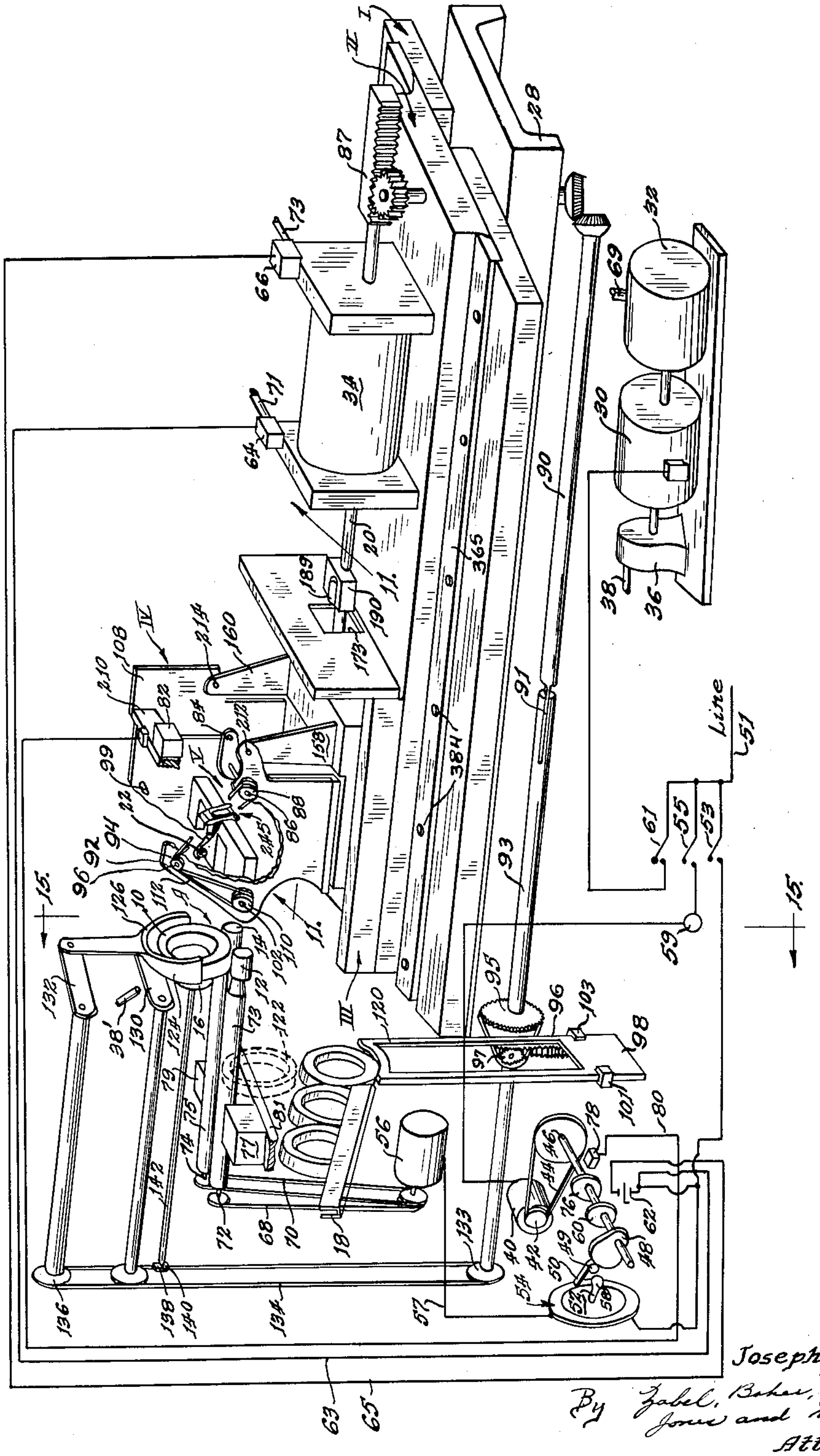
FIGURE 1 is a schematic, isometric view showing all of the operable parts of the machine excepting the gauge carriage, but without supporting and detail structure.

The parts of applicant's machine can be more easily explained if the functions of the machine are understood. Referring to schematic FIGURE 1, the numeral 10 identifies a ring having an internal raceway resting freely on two work-supporting rolls 12 and 14. The numeral 16 identifies an ejector. The rings 10 are fed down chute 18 to a loading mechanism which through a clamp successively places the rings on the rolls 12 and 14.

The machine utilizes five carriages. Roman numeral I identifies the base carriage upon which the other four carriages are mounted. This carriage I may be moved vertically to any desired height within a selected range of four or five inches. Mounted on the base carriage I is a table slide II, which normally is rigidly fastened to the base carriage I, but which may be moved to the right for perhaps six inches so that everything mounted thereon is accessible for cleaning, repairing, setup, and testing operations. Slideably mounted on the table slide II is a positioning carriage III, which may be reciprocated from right to left by a piston 20. Pivotally mounted on the positioning carriage III is a work head IV. Pivotally mounted on the work head is a gauge carriage V, see FIGURE 11. On the work head IV is a vertically positioned stone 22, which may be oscillated in a vertical plane at right angles to the raceway of the ring 10.

Figure 17:
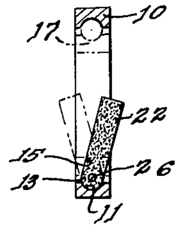
FIGURE 17 is a sectional view of a ball bearing assembly illustrating the oscillation center of the stone; and, FIGURE 18 is a schematic side view of a ring resting on the rolls.
Figure 18:
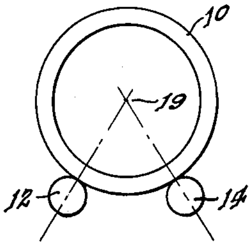

The superfinishing machine must be able to do these things: Firstly, finish an internal raceway; secondly, finish internal raceways on rings of different diameters; thirdly, finish raceways having different cross sections; and fourthly, perform these operations on an external raceway. The specific problem is illustrated in FIGURES 17 and 18. The ring 10 has been ground and the object is to superfinish its raceway 11 so as to receive balls 13 which will engage the raceway 11 and the raceway 15 on an internal ring 17, the latter being shown in dotted line only. The stone 22 must be oscillated around a center 26 which is distant from the raceway 11 by the radius of ball 13. But assuming the same diameter ring but larger balls, the oscillation point of the stone 22 will move away from the raceway 11, because it always must be distant therefrom by the radius of the balls. On the other hand, if the ring size remains the same, but smaller balls are used, the axis of oscillation is moved closer to the raceway 11. Also in applicant's machine, the center of the ring irrespective of the ring's diameter is always at the point 19, see FIGURE 18. To accommodate rings of different diameters, the rolls 12 and 14 are either spread apart or drawn together along converging paths passing through the center of all rings at point 19.

Figures 2, 3, 4, 5, 6, 7:
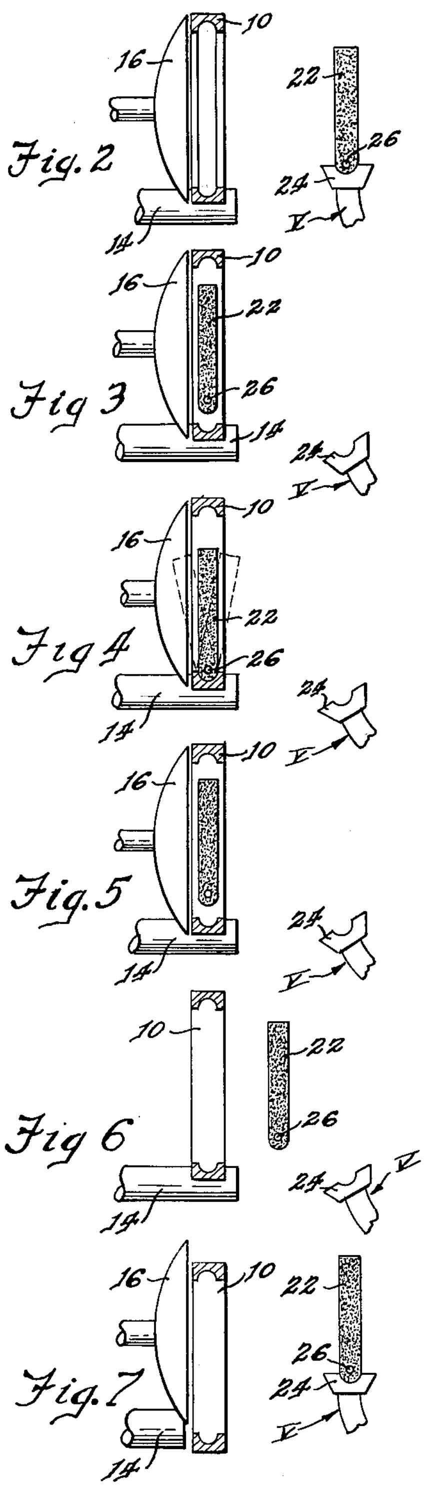
FIGURES 2 through 10 are schematic views illustrating the steps of applicant's method.

These operations are illustrated in schematic FIGURES 2 to 10, and they will be briefly described. FIGURES 2 through 7 illustrate the method and portions of the apparatus for finishing an internal raceway which has already been ground. Referring to FIGURE 2, the stone 22 is shown resting in a gauge 24 mounted on the gauge carriage V and spaced from the ring 10 which rests freely on the two rolls such as 14. These rolls are rotated in the same direction, and as shown the ring 10 has just been placed in position and in a standard cycle, the rolls 12 and 14 initially are rotating the ring at about ten rotations per minute. On the forward movement of the work head IV, the gauge carriage V is lowered to the position shown in FIGURE 3, and the stone 22 is moved into the ring 10. The bottom of the stone which is curved to the shape of the ring is above the surface of the raceway in order to clear the edge of the raceway and not disturb the ring which is not held.

In the next step, the finishing stone 22 is lowered to the position shown in FIGURE 4, and simultaneusly, the stone is oscillated back and forth within a pre-selected arc, indicated by the dotted lines. In a standard cycle of 30 seconds, the rate of oscillation of the stone 22 is decelerated from 600 to 10 oscillations per minute, and the rotation of the rolls 12 and 14 is gradually accelerated to 900 r.p.m. from 10 r.p.m. This maximum speed may be attained at any desired point in the cycle, but commonly occurs after about 30 seconds. At the end of the 27 seconds, the work head is again raised so that the stone 22 is disengaged from the raceway, as illustrated in FIGURE 5. Thereupon, the work head is retracted as illustrated in FIGURE 6, with the gauge carriage V moving up. As the stone reaches its position above the gauge carriage V, referring now to FIGURE 7, the ejector 16 is sharply actuated to push the ring 10 off the rolls 12 and 14 so that it may drop clear of the machine. The time consumed in going from the position of FIGURE 2 to the position of FIGURE 4, and then from the position in FIGURE 4 to the position in FIGURE 7, is approximately three seconds. The time spent in the position of FIGURE 4 is approximately 27 seconds. The relationship of these times and the total time varies with the different types and sizes of rings and the degree of finishing desired.

Figures 8, 9, 10:
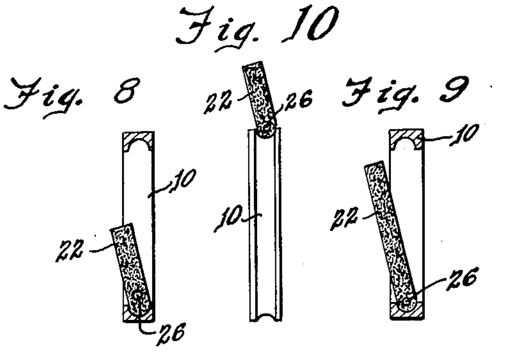

The stone oscillates in FIGURES 2 through 7 around the axis 26, see FIGURE 4. Where the diameter of the ball is greater, the stone oscillates around an axis more distant from the raceway, as indicated in FIGURE 8. Where the ball is of very small diameter, the stone oscillates around an axis which is closer to the raceway, as illustrated in FIGURE 9.

In order to finish the exterior of a ring, the base carriage I is raised so that the stone will engage the top of the ring 10 as indicated in FIGURE 10.

The machine is entirely automatic. It is important that the ring rest freely on the two rolls 12 and 14. The ejector 16 does not rotate, and while the ring may be immediately adjacent to it at the time the stone moves down into the raceway in FIGURE 4, the stone and the raceway quickly adjust themselves to each other, and the ejector 16 is slightly spaced from the ring. Because the ring starts rotating slowly while the stone oscillates rapidly, the cutting operation produces a criss-cross pattern at nearly right angles to the line of the ring's rotation resulting in very rapid cutting. This scrubs off the stone's glaze from the previous ring finishing and exposes a clean and sharp stone surface again.

*The Operating Parts of the Machine*

The operating parts of the machine are intricate and showing them in detail is not necessary to disclose an operable invention. In FIG. 1, applicant shows a perspective of all of the essential operating parts, but omitting the frame and all of the details of construction such as frame members, blocks, holding shafts, nuts and bolts, etc.

The only assembly that will be shown in detail is that of the three carriages III, IV and V, which are responsible for the movement of the stone into and out of the finishing zone A, all other equipment being self-evidently operable from merely an inspection of FIGURE 1.

Referring to FIGURE 1, the numeral 28 identifies a frame support upon which all of the moving parts are mounted by appropriate bearings and the like which are not shown. A motor 30 drives an oil pump 32, which supplies oil pressure to both ends of a main drive cylinder 34, rigidly mounted on the table slide II. The motor 30 also drives a lubricant pump 36 which supplies liquid coolant to a tube 38, 38′, whose outlet is directed upon the ring 10 in the finishing zone A.

A motor 40 through a reduction gear 42 and chain drive 44 drives a cam shaft 46. One cam 48 on this cam shaft 46 engages a cam follower 49 rotatably mounted on an arm 50 which is pivoted on principal shaft 52 of a rheostat 54. The rheostat output is connected to a variable speed motor 56 by a conductor 57. By rotating the shaft 52 upon which is mounted the arm contact 58, the speed of the motor 56 may be varied. By disengaging the cam follower arm 50, the rheostat arm's contact 58 may be manually set to operate the motor 56 at any selected speed.

The motor 56 through two belts 68 and 70 drives two shafts 72 and 74 carrying the cylindrical rolls 12 and 14 on their ends. These rolls 12 and 14 are in the finishing zone A and the ring 10 rests upon them. These rolls rotate in the same direction, but either direction may be used. The shafts 72 and 74 are mounted respectively in housings 73 and 75 which are mounted respectively on slides 77 and 79, see FIGURE 15. The slides 77 and 79 are movable in guideway 81 inclined at opposite angles of 36° so that the axes of the housings 73 and 75, which are the axes of rotation of the rolls 12 and 14, will converge toward the center of the ring 19. Each slide has a rack 83 engaged by a pinion 89 which through its shaft and a gear not shown are rotated by reverse worms 426 and 428 on a shaft 425. By rotating the shaft 425, the slides 77 and 79 will converge on or move away from point 19.

In applicant's preferred practice, the contour of the cam 48 is such that the rheostat arm 58 will initially on each complete rotation of the cam shaft 46 drive the motor 56 at a speed such that a ring resting on the rolls 12 and 14 will rotate at approximately 10 r.p.m., and during 27 seconds steadily accelerate to about 900 r.p.m. When the ring is pushed off the rolls 12 and 14, by the ejector, the motor during three seconds drops back down to about 10 r.p.m., and the rolls 12 and 14 are in fact slowly turned when the next ring is positioned upon them. Whether the rolls 12 and 14 are rotating when a ring is positioned upon them is optional. They could be stopped at the moment of positioning a ring. The shaft 46 completes the cycling of the machine on each complete revolution. The length of the cycle can be varied by any of several means positioned between the cam shaft 46 and the motor 40, or by varying the speed of the motor 40. Applicant usually uses a 30-second cycle, 27 seconds for finishing and 3 seconds for reloading and resetting the stone.

A second cam 60 on the shaft 46 functions a two-position switch 62 which is connected to two solenoid-controlled valves 64 and 66, which function the piston 20 in the cylinder 34 positively in either direction. The cam 60 is such that at the beginning of a cycle, the piston 20 moves to the left, thereby moving the positioning carriage III and the work head IV into the work station A, holding the work head there for 27 seconds, and at the end of the cycle retracting the work head to the position shown.

Returning now to the cam shaft 46, a third cam 76 opens a valve 78 in an air line 80 connected to an air cylinder motor 82. The speed of the air motor 82 depends upon the air pressure and it can be adjusted from 10 to 700 r.p.m. This air cylinder motor reciprocates an arm 84. The arm 84 is mounted on a shaft 86 on the positioning carriage III. Mounted on each end of the shaft 86 are pulleys 88 and 280, see FIGURE 12. Two pulleys 92 and 94 are freely rotatable on stub shaft 96, and like pulleys, not shown, are freely rotatable on shaft 98. A crank shaft 100, having outwardly directed journals 102 and 104, is mounted between the side walls 106 and 108 of the work head IV. Keyed to the outside end of each trunnion is a pulley 110. Entrained over the pulleys 88, 92, 94 and 110 is a belt 112, and a similar belt is entrained over like pulleys on the far side of the wall 108. Mounted on the crank throw 100 is a stone holder 117 in the front end of which is a vertical channel 114 in which the stone is held by clamp 116, allowing the stone to project downward an exact predetermined distance while work is in progress. The stone is urged downwardly by the spring 256 only when clamp 116 is released. The stone holder is of a length and size such that it may enter a ring with the axis of oscillation as indicated in FIGURES 4, 8 and 9. By oscillating the arm 86, the crank shaft 100 will oscillate.

All of the remaining operable parts are driven by the piston 20. Referring to FIGURE 1, mounted on the outer end of the piston 20 is a rack 87 which through a shaft and gears drives a shaft 90. The shaft 90 through a slot and tongue arrangement at 91 drives a shaft 93. This mechanical arrangement permits movement of the slide table II from left to right while still maintaining all parts in operable working condition. Mounted on shaft 93 is a sprocket 95 which through a chain, sprocket and shaft, drives a gear 97. Gear 97 engages a rack 96 mounted on a slide 98 movable vertically in guideways 101 and 103. On the upper end of the slide 98 is disposed a ring feeder 120 which is shown in its lowermost position where a ring rolling down the chute 18 will drop into the feeder 120. The slide 98 moves upwardly and pushes the ring into the dotted-line position 122.

Also mounted on the shaft 93 is a sprocket 133 over which is entrained a chain 134 entrained over a sprocket 136 mounted on the upper part of the machine. A drive cam 138 is associated with this chain 134, and is adapted to engage a cam follower 140 on a shaft 142, on the end of which is mounted the ejector 16.

All necessary electric wiring is shown schematically in FIGURE 1. The numeral 51 identifies the line. A switch 53 may be closed to energize the switches 62, and the rheostat 54, depending upon the specific position of associated cam follower of each on the cam shaft 46. Closing switch 55 will energize a potentiometer 59 which in turn will energize the motor 40 at any selected speed. A switch 61 upon closing will energize the motor 30. The rheostat 54 by conductors 57 energizes the motor 56. The switch 62 is a two-pole switch and through conductors 63 and 65 respectively energizes the solenoids 64 and 66. The valve 78 by conductor 80 controls the airline connected to the air cylinder motor 82. The hot and ground lines of the electric circuits are not shown, and it will be appreciated that arrangements can be made to function all of the moving parts of the machine by throwing a single switch. The output 69 of the pump 32 is connected to an intake 71 to a valve controlled by the solenoid 64 and to an intake 73 of a valve controlled by the solenoid 66.

The operation of the machine is as follows. The parts as shown in FIGURE 1 are at zero position, which means that the ring 10 has just been placed on the rolls 12 and 14. The positioning carriage III is fully retracted to the right. At this moment, the cam shaft 46 is also at zero position.

The switch 61 is closed which establishes hydraulic pressure at the valves to the cylinder 34 controlled by the solenoids 64 and 66 and provides lubricating coolant in the finishing zone A through the tube 38′. The switch 55 is closed and the speed of the motor 40 which drives the cam shaft 46 is determined by the potentiometer 59. The switch 53 is closed and this will energize the various solenoids under the control of the switches and their cam followers. As the cam shaft 46 rotates, the cam 60 opens the solenoid 66, which causes the piston 20 to move to the left under oil presure from pump 32. As the piston moves to the left, the crank shaft 100 straddles the rink 10 with the stone 22 entering the ring. Concurrently, the rack 87 is rotating the shaft 90. This causes arms 130 and 132 to move counter-clockwise and carry the ring feeder jaws over to a point above the dotted ring 122. Simultaneously, the feeder slide 120 is pushing a ring up into the position of the dotted ring 122. As the positioning carriage III reaches the end of its stroke moving the polishing stone 22 into the ring, the work head IV is let down so that the stone may rest in the ring raceway 11. At this moment, the air motor 82, responsive to cam 76 functioning valve 78, starts to function the arm 84 which causes the crank shaft 100 to rock for any desirable length of time at a speed dependent upon the amount of air passed by the valve 71. The switch 62 functions the solenoid 64 causing the piston rod 20 to move to the right. When this occurs, the feeding clamps 130 and 132 carry the ring which had been in the dotted-line ring 122 over to the solid-line position shown in FIGURE 1, while the feed slide moves downwardly to the solid-line position shown. As the positioning carriage III reaches its limit to the right, the reset gauge carriage V is brought up underneath the stone, which is momentarily released by the clamp 116 so that the stone being urged by spring 256 resets to compensate for wear during the previous finishing operation. During the three second between the 27-second finishing steps, the air cylinder 82 is not actuated so that the crank shaft 100 lies in a horizontal plane.

It is seen, therefore, that the machine is essentially very simple.

*The Positioning Carriage and the Finishing Head*

Figure 11:
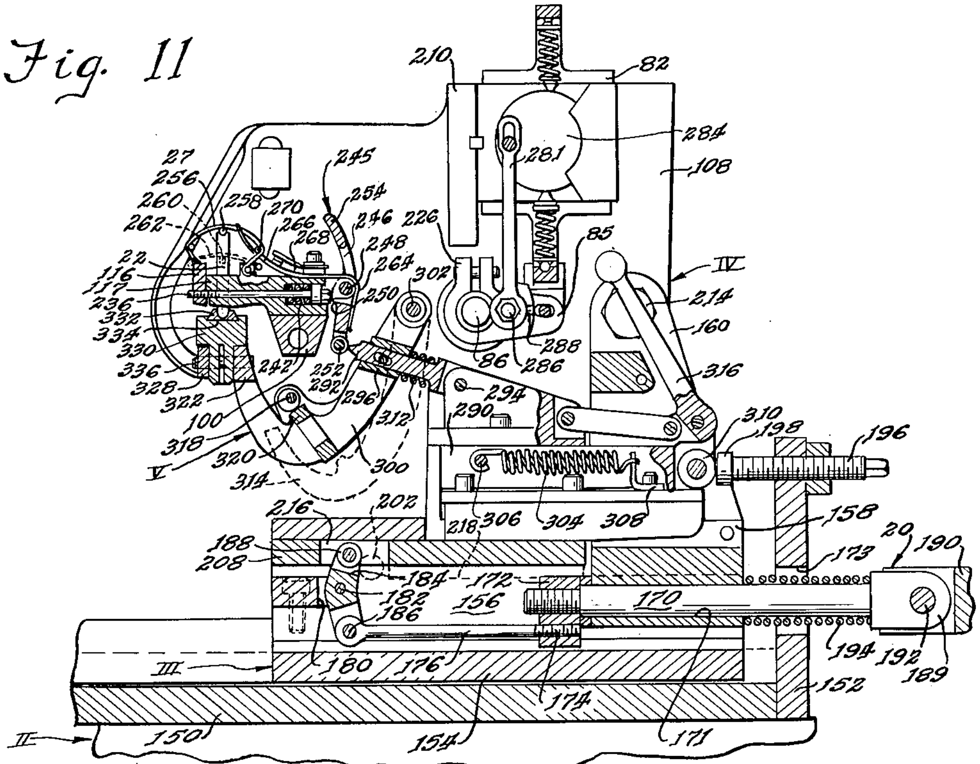
FIGURE 11 is a view taken on the line 11—11 of FIGURE 1 of the positioning carriage III, a work head IV, and gauge carriage V.

The positioning carriage and finishing head will be described in detail. Referring to FIGURE 11, mounted rigidly on the slide table II is a base plate 150, having an upwardly directed plate 152. Slideable parallel to the length of the slide table II is the positioning carriage III, consisting of a heavy block 154, having a longitudinal channel on its upper side 156, and upon which is mounted at opposite sides brackets 158 and 160, see also FIGURE 1. Extending rearwardly from the block 154 are two rods 162 and 164, see FIGURE 12, parallel to the top surface of the slide table II and slideable through holes in the plate 152. The inner ends of the bolts 162 and 164 are threaded into the block 154, FIGURE 11, whereby the exact stroke of the reciprocating carriage toward the finishing zone A may be exactly set. Centrally of the block 154 is an opening 171 through which passes a rod 170, threaded at its left-hand end to receive nut 172 with offset portion 174. Mounted in a threaded hole in the offset portion 174 is a link 176, which is in the upwardly open recess 156 in the block 154. A tongue 180 projects inwardly of said recess 156 from the finishing zone side of the block 154, and on this tongue is mounted a shaft 182, which in turn carries a bell crank lever 184, whose lower end is connected by a pin 186 to the link 176. The upper end of the bell crank lever carries a freely rotatable roller 188.

Figure 12:
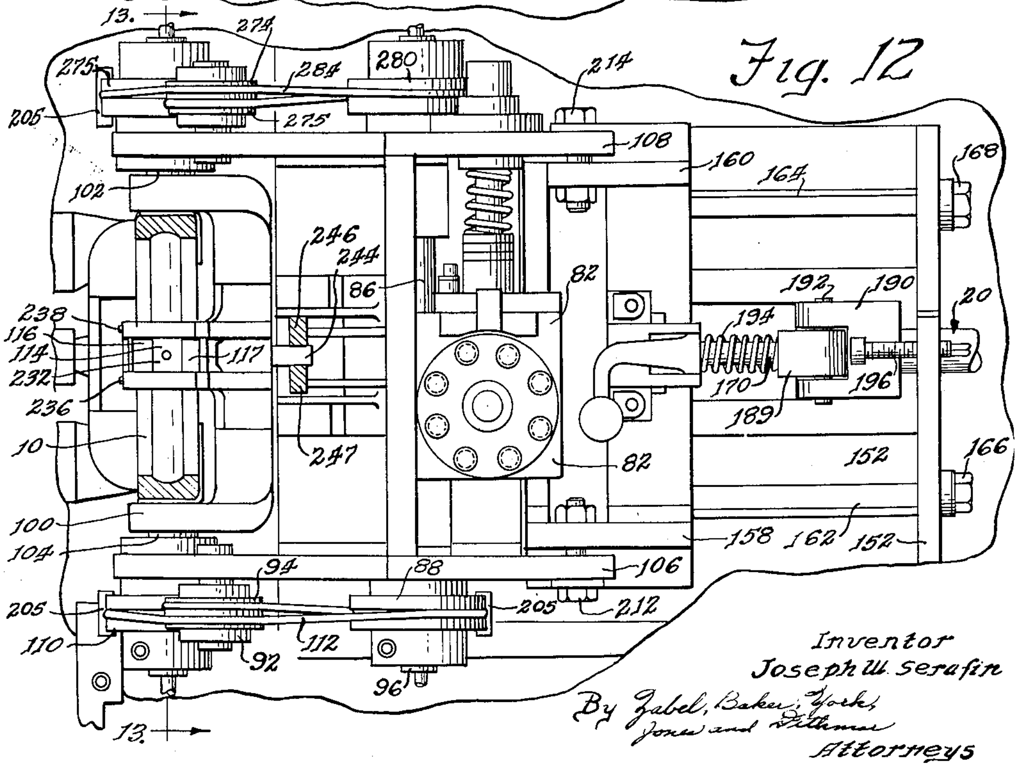
FIGURE 12 is a plan view of the positioning carriage III, work head IV, and gauge carriage V.

The other end of the rod 170 carries a block 189 which by a pin 192 is connected to a yoke 190 mounted on the end of the piston rod 20, referring to FIGURE 12. A helical spring 194 around the rod 170 is positioned between the block 154 and the block 189. Referring to FIGURE 12, a threaded bolt 196 is mounted on the plate 152.

The positioning carriage III functions in this way. When the piston rod 20, referring to FIGURES 11 and 12, moves to the left, and the total stroke in this machine is about four inches, the tension of the spring 194 is such that the block 154 is held immovable between the nut 172 and the block 189 until the bolt heads 166 and 168 strike the right-hand side of the plate 152. At this point, the positioning carriage III stops, but the stroke of the piston continues with the shaft 170 moving to the left in the passageway 171, and the link 176 moving the bell crank lever 184 in a clockwise direction so as to move the roller 188 into the dotted-line position 202. The spring 194 is compressed. On a return movement of the rod 20, the positioning carriage III does not initially move, being held in the left-hand position by the spring 194. Instead, the link 176 rotates the bell crank lever in a counterclockwise direction so that the roller 188 moves into the solid-line position of FIGURE 11. When the nut 172 contacts the wall of the block 154, the positioning carriage III commences to move to the right and continues to do so until the end of the stroke of piston rod 20 is reached. By means of the adjustable bolts 166 and 168, the exact left-hand position of the carriage may be set without reference to the stroke of the piston 20.

The work head IV consists of two vertical plates 106 and 108 held in spaced relationship at the bottom by a plate 208 and at the top by a plate 210. This work head IV is pivotally mounted on the brackets 158 and 160 by means of tapered bolts and nuts 212 and 214, referring to FIGURE 12, so that its left-hand side, as viewed in FIGURE 11, may be raised or lowered. This raising and lowering is effected by means of the channel 216, see FIGURE 11, in which rides the roller 188. As the end of the stroke of the piston 20 toward the finishing zone A is approached, the roller 188 is moved upwardly, raising the plate 208 and work head IV above the positioning carriage III to the position shown in FIGURE 11. It follows that at the end of the stroke toward the finishing zone, the finishing head IV drops to the dotted-line position 218, and at the commencement of the return stroke, it rises to the solid-line position shown in FIGURE 11, and then moves to the right.

Figure 13:
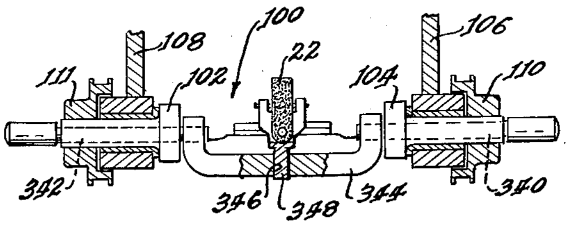
FIGURE 13 is a view taken on the line 13—13 of FIGURE 12.

The stone is mounted on a crank shaft 100. Referring to FIGURES 12 and 13, journals 102 and 104 are machined in axial alignment on the crank shaft 100 and are journaled in the forward portions of the side plates 106 and 108 of the work head IV. Keyed to the journal shafts 102 and 104 respectively are belt pulleys 110 and 111 which are on the outside of the walls 108 and 106 of the finishing head carriage IV, as indicated in FIGURES 12 and 13. Between the inner ends of the journal shafts 102 and 104, the space is open. Mounted on the crank shaft 100 and extending toward the axis of the journal shafts is a stone holder 117, which on the finishing side contains a through vertical channel 114 rectangular in cross section to receive the vertical stone 22, and longitudinally of the stone holder are two cylindrical passageways in which are mounted respectively bolts 236 and 238 which hold a clamping block 116 in engagement with the open side of the channel 114. These two bolts are urged by springs such as 242 to the right, see FIGURE 11, so that the block 116 and the holder act as a clamp to hold the stone 22 in fixed vertical position. The heads of the bolts 236 and 238 protrude rearwardly of the stone holder as shown in FIGURE 11. Mounted on a tongue 244 projecting rearwardly of the stone holder 117 is a lever 245 having two arms 246 and 247, pivoted at 248, and each arm having a cam surface 250 engageable with one of the bolt heads 236 and 238. Mounted on the lower end of the lever 245 is a roller 252 and on the upper end a finger pad 254. By pushing the roller 252 to the left or moving the finger pad 254 to the right, the bolts 236 and 238 will be moved to the left against action of the springs 242 to move the clamp 116 to the left so as to release the stone 22. Mounted on top of the clamping block 116 and the stone holder 117 is a spring 256 having a drive element 258 positioned vertically over the recess for the stone. The spring is such that as the top of the stone moves down due to wearing at the work end to a position such as dotted-line position 260, the spring will assume the dotted-line position 262. The spring moves the stone downwardly when the stone is unclamped in the stone holder. Mounted on top of the stone holder 117 is a flat spring 264 which engages the lever 245 and holds it firmly against the heads of the bolts 236 and 238 to dampen flip-flopping action during oscillation. Also mounted on top of the stone holder are two electrically conductive spring leaves having contacts normally in engagement with each other 266 and 268. A pin 270 mounted on the spring 256 engages the leaf 266. When the spring 256 reaches the dotted-line position 262, the leaf 266 is pulled down sufficiently far to open the contacts between itself and the leaf 268. These two leaves are in a circuit containing a switch which opens circuits and stops the machine.

Mounted on journal shafts on the plates 106 and 108 are the pulleys 92 and 94, 274 and 275. These are freely rotatable idler pulleys. Also mounted between the plates 106 and 108 is a shaft 86. This shaft carries at opposite ends keyed pulleys 88 and 280. Entrained over the pulleys 88, 92, 94 and 110 is a single belt 112 which causes the pulleys 92 and 94 to rotate in opposite directions. The pulleys 88 and 110 are keyed to their respective shafts. A belt 284 is similarly entrained over the pulleys 280, 274, 275 and 277. Movements of the shaft 86 will be communicated to the journals 102 and 104 of the work head IV so as to oscillate the stone 22. The numeral 205 identifies a clamp which holds the belt firmly to the pulley to prevent slippage. The belts are similarly clamped to pulleys 110, 88 and 280.

Mounted on the plate 210 is an air motor 82 which supplies oscillating power to the arm 85. This motor is of the reciprocating type run by air from a plant's compressed air supply line. The air is supplied through a pressure regulator and air lubricator, not shown. The stroke of the air motor 82 can be regulated by the valve link 281 connected at its top to an oscillating-type valve 284 located on the side wall of the motor 82. The valve link 281 pivots on a T-bolt and roller 286. The T-bolt head 286 seats in a T-slot 288 in the drive shaft crank 226. By moving the T-bolt 286 in the T-slot 288 into or away from the center of the driven shaft 88, the length of the stroke will be increased or decreased. Applicant operates the stroke of the air motor 82 at about ¾", which produces a reverse rotation in the shaft 88 of approximately 38°. However, as shown, the motion can be set for any point between 30° and 40°.

The idler pulleys 92, 94, 274 and 275 located almost directly above respectively the pulleys 110 and 277, because they maintain an upward pressure of the journals 102 and 104 against their bearing, eliminate any up and down play, and thereby permit exact resetting of the stone 22 against a resetting gauge about to be described which is swung up from below. Also, the nearly vertical pull tends to keep the crank shaft 100 moving in an undistorted arc. Finally, by holding the journals 102 and 104 tightly against their journal bearings, one duplicates a condition that exists during the actual work cycle, i.e., the head's own weight already bearing on these same journals results in no changing of the stone's radial length when the stone contacts the ring raceway itself or the reset gauge.

A slide 290 supported on the bottom of the work head IV carries a clevis pin 292 pivotally mounted at 294 and slideable in a journal 296, which is mounted between two arms such as 300 pivoted on a shaft 302 extending between the walls 106 and 108. The slide 290 is urged to the right, referring to FIGURE 11, by spring 304 which is anchored at 306 to the slide and at 308 to the base of the work head IV. A roller 310 is in alignment with the head 198 on the bolt 196 mounted on the upright plate 152 which is rigidly fixed to the table slide II. As shown in FIGURE 11, the slide 290 has been moved to the left because the roller 310 has engaged the head 198. In so doing, the head of the clevis pin 292 has engaged the roll 252, thereby moving the bolts 236 and 238 to the left, releasing the clamp on the stone 22 which permits it to drop by pressure from the spring 256, FIGURE 11. Slightly before this occurred, the spring 312 which engages the journal 296 has moved the arms such as 300 out of the dotted-line position 314 into the solid-line position shown. The total movement of the arms such as 300 and of the clevis pin 292, and the time of the movement, is controlled by adjusting the threaded bolt 196. A lever 316 is pivotally linked to the slide so that by rocking it, the clevis pin 292 may be manually engaged with the roll 252 so as to release the work stone and to insert a new one. By moving lever 316 fully to the left, no further manual setting of the stone is required.

The upward movement of the arms such as 300 is limited by an eccentric stop bushing 318 which is pivoted between the walls 106 and 108 and which engages a member 320 which joins the two arms such as 300.

Mounted on the outer ends of the arms 298 and 300 is a gauge holder 330 which is vertically split and held to a cross portion 322 between the arms such as 300 by a clamping plate 328 and bolts 336. By tightening the bolts 336, the two upper ends of the holder can be drawn toward each other. The upper end of the gauge holder carries a channel 334 in which is seated a segment 332 made out of a finished stock of the same size ring that is to be finished.

Setting up the stone initially proceeds as follows. Referring to FIGURE 13, the two journals 102 and 104 are axially centrally drilled very accurately to receive pins 340 and 342. The inner ends of these two pins hold a removable yoke 344 in the center of which is an opening 346 in which may be mounted a setting gauge item 348. The bottom of the channel of the gauge insert 348 is at the exact level of the surface of the raceway of the particular ring that is to be finished, or a distance of one-half the ball diameter from the axis of the journals 102 and 104. Thereupon, the stone 22 is pressed down its channel until it firmly engages the insert 348. This means that the bottom or working surface of the stone will oscillate in an arc which exactly duplicates the cross section of the raceway of the ring. The stone is clamped in position. Thereupon, the two pins 340 and 342 are withdrawn, which drops out the temporary yoke 344. Then, using the lever 316, the reset gauge arms such as 300 with the segment of the ring 332 already mounted, is moved up until it precisely engages the bottom of the stone. In order to obtain exact engagement, the eccentric stock bushing 318 is used, see FIGURE 11. When the exact setting is obtained, it is evident that on a movement of the work head to the right after each finishing cycle, the work surface of the stone may not touch the gauge insert 332 because the stone is partially worn. However, the clamp is released so that the stone may drop by spring action into the insert 332. At the end of each finishing cycle, therefore, the stone is reset. The important thing is that the finishing surface of a reset stone oscillates in an arc having a radius exactly equal to that of a ball to be placed in the finished raceway. All height requirements are taken care of by the pivoted head IV.

Figure 14:
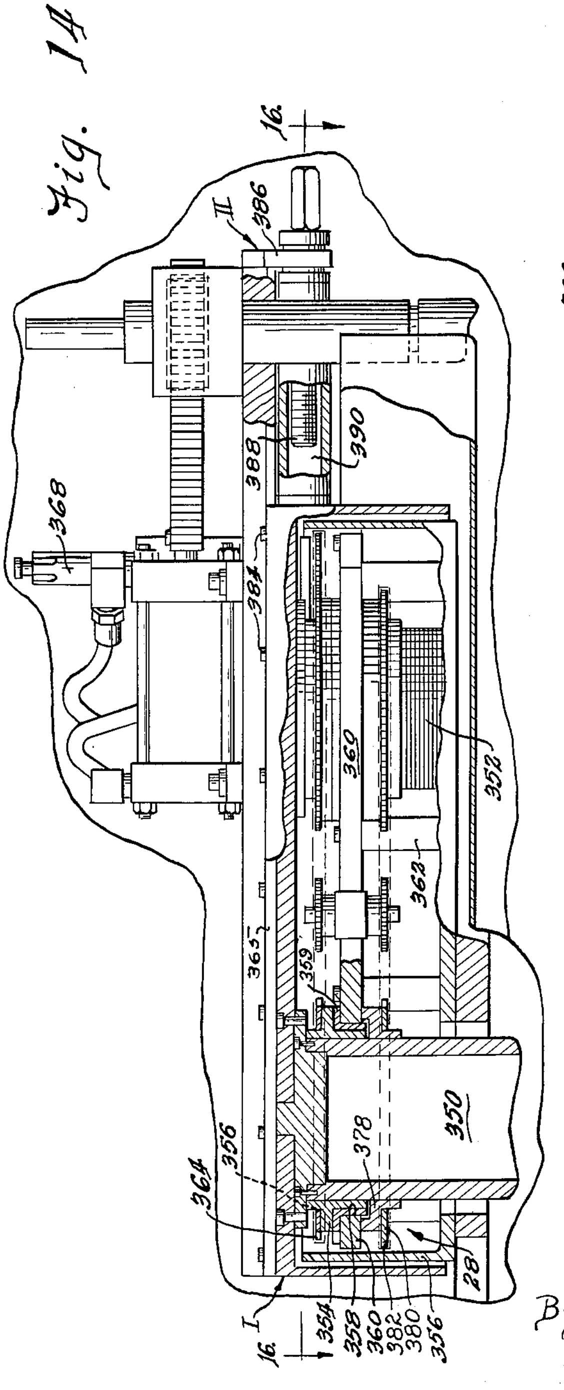
FIGURE 14 is a side view, partly in section, of the base carriage I and the table slide II.
Figure 16:
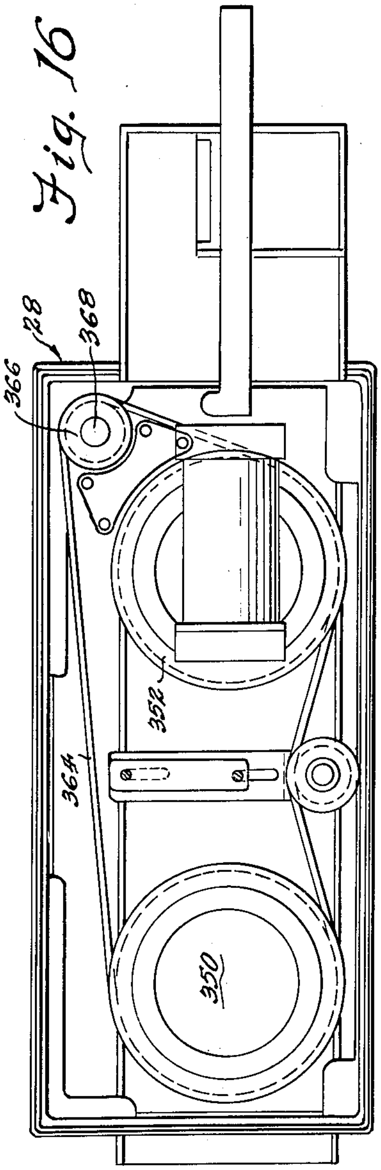
FIGURE 16 is a view taken on the line 16—16 of FIGURE 14.
Figure 15:
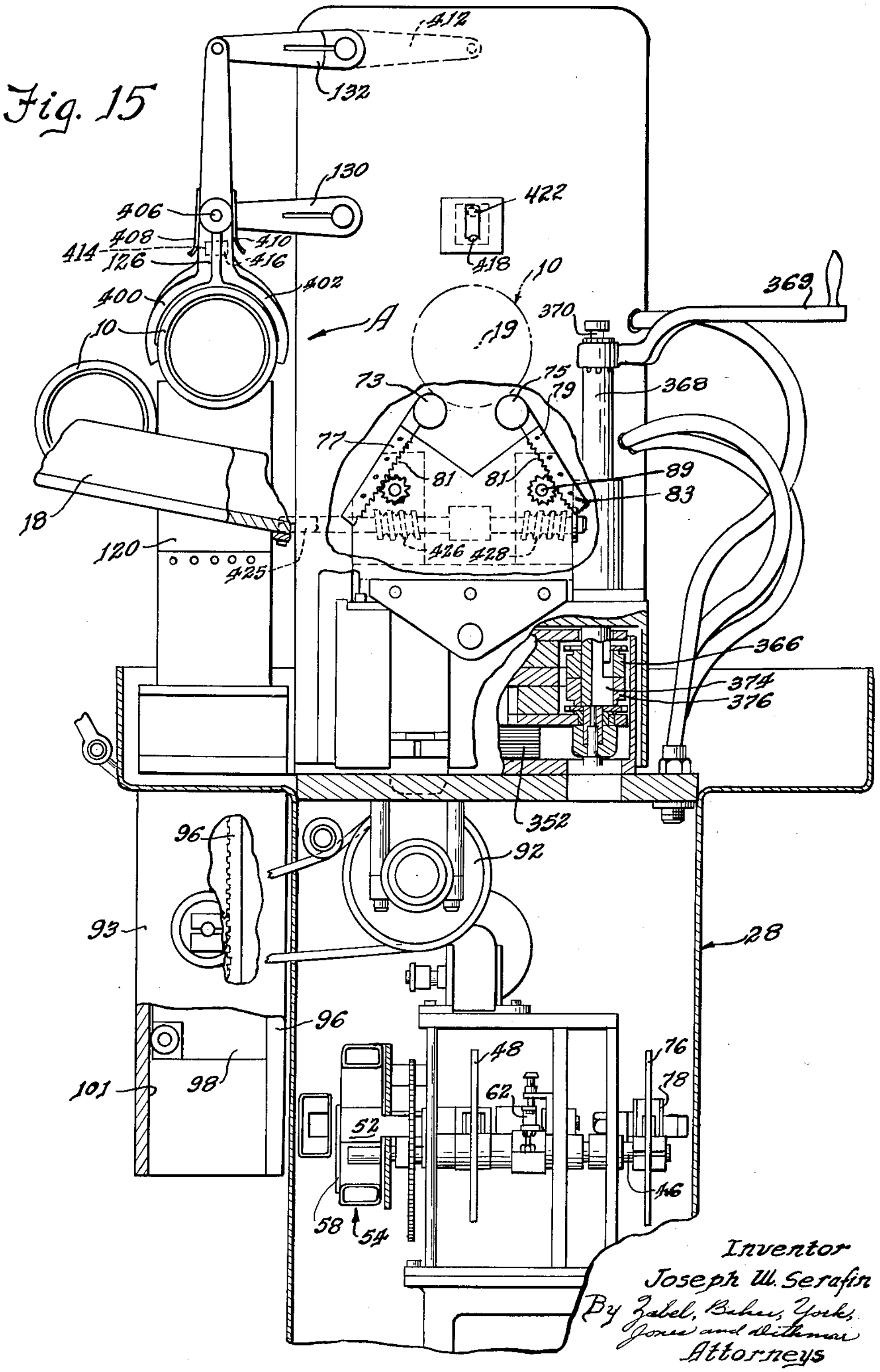
FIGURE 15 is a view of the right end of the base carriage I and slide table II with the other three carriages removed so that the front of the work zone, the loading fingers, and the main cam shaft may be seen.

In FIGURES 14, 15 and 16, structure for raising the base carriage I with respect to the frame II is shown. The machine frame is identified by the numeral 28, while the base carriage is identified by the Roman numeral I. Depending from and rigidly fastened to the base carriage I are two jack screws 350 and 352. Each jack screw is externally threaded, see 352, and the threads of each jack screw engage respectively a threaded collar 354, which is keyed to a sprocket 356. The threaded collar 354 is seated in openings such as 358 in a supporting plate 360 mounted on pillars 362 on the machine frame. An auxiliary collar 359 is positioned between the members 360 and 354. A chain 364 is entrained over the sprockets 356, see FIGURE 16, and over a sprocket 366 mounted on a vertical shaft 368. By rotating the shaft 368, the threaded collars 354 around the two jack screws 350 and 352 will be rotated and cause the jack screws to rise or sink.

Referring to FIGURE 15, the shaft 368 is centrally drilled to receive a rod 370. This rod carries a key 374 which may engage the sprocket 366 and a lower sprocket 376 simultaneously when the rod 370 is in its upper position, but only the sprocket 376 when the key is in its lower position. The sprocket 376 is in horizontal alignment with lock nuts such as 378, see FIGURE 14, which are engageable with the threads of the jack screws 350 and 352 and the under surface of the plate 360. Each lock nut 378 has a sprocket 380. Entrained over these sprockets is a second chain 382, which is also entrained over the lower sprocket 376, see FIGURE 15. By rotating the shaft 368 in a counter-clockwise direction as viewed from above, with the key 374 engaging only the sprocket 376, the lock nuts such as 378 will be turned counterclockwise and move down on the jack screws 350 and 352. The position of key 374 is controlled by applying a finger to the top of the rod 370, see FIGURE 14. Thereupon, the rod 370 is allowed to move upwardly and by turning the crank 369, both chains 364 and 382 are driven, and the jack screws 350 and 352 rise, carrying the base carriage I to any selected height within the range of the jack screws. The base carriage is maintained in very rigid relationship with the frame, and this is essential because all of the other carriages are mounted upon it.

The means for moving the table slide II to the right is indicated in FIGURE 14. Normally, the table slide is held to the base carriage I by a clamping strip 365, see FIGURE 1, held by bolts 384. By removing these, the slide table is free to slide longitudinally of the base carriage I. Mounted on the outer end of the slide table II is a collar 386 which rides between bushings on a threaded bolt 388 which is engaged with an internally threaded cylinder 390 rigidly mounted on the base carriage I. By turning the screw 388, it will move outwardly of the cylinder 390 and pull with it the slide table II. In doing this, referring to FIGURE 1, the shaft 90 is not disconnected from the shaft 93 because of a slide coupling indicated by the numeral 91.

Referring to FIGURE 15, the ring feed mechanism is shown but not in detail. The ring clamp 126 consists of two wear plates 400 and 402, which are pivoted on a shaft 406 and pressed toward each other by springs 408 and 410. The arms 130 and 132 pivot around their journals between a dotted-line position 412 and the solid-line position shown, the movement being counter-clockwise from the dotted position and clockwise from the solid position. When the feeder moves from the dotted-line position to the solid-line position, the feed carriage 120 is in its upper position so that the wear plates 400 and 402 are spread by a ring and clasp it under pressure of the two springs. Mounted on the back of each wear plate is a lug 414 and 416. As the arms position the feeder 126 over the rolls 12 and 14, the lugs 414 and 416 straddle a roller 418 which is freely vertically slideable in a channel. The roller 418 is, therefore, in the solid-line position shown in FIGURE 15. When the lugs 414 and 416 engage the roller, the wear plates 400 and 402 are spread apart to release the ring. On the counter-clockwise movement of the arms 130 and 132, the wear plates do not reclasp the ring because the roll 418 is held between the lugs 414 and 416, and it moves vertically with its slide to the dotted-line position 422. Having reached the limit of its movement, the roller 418 is disengaged from the lugs 414 and 416 so that the wear plates 400 and 402 are again pressed toward each other by the springs 408 and 410 so that on reaching the solid-line position and being forced downwardly, they will be spread over a ring held by the feeder 120.

Having thus described his invention, what applicant claims is:

1. In combination with a machine for finishing a raceway on a ring having two parallel, transversely aligned rolls with means for rotating said rolls at the same speed, and a positioning carriage movable horizontally between a position adjacent the rolls and a spaced position endwise of the rolls, a finishing head mounted on the positioning carriage, frame members mounted on the finishing head projecting toward the rolls and spaced by a distance greater than the rolls so that upon a movement of the positioning carriage toward the rolls the frame member will straddle the rolls, aligned bearings in said frame members, one in each frame member, a crank having a journal on each end rotatably disposed in said bearings, said crank having a throw, an arm mounted on the throw extending forwardly toward the axis of the bearings, a solid abrasive having a lower surface contoured to a raceway to be worked mounted on the arm, and means for oscillating the crank.

2. The combination of claim 1 wherein the means for oscillating the crank comprises a pulley keyed to one journal of the crank, a parallel drive shaft parallel to the axes of said journals mounted on the finishing head, a pulley keyed to said drive shaft and aligned with the first pulley, a belt entrained over said pulleys, and a motor and linkage connected to said shaft for oscillating said drive shaft.

3. The combination of claim 1 wherein the means for oscillating the crank comprises a pulley keyed to the outer end of each journal of the crank, a shaft mounted parallel to the journals of the crank on the frame and spaced therefrom, a motor and linkage for oscillating said shaft, a pulley on each end of the shaft, and a belt entrained over each pulley on the shaft and the associated pulley on the crank.

4. The combination of claim 1 wherein the throw of the crank is away from the rolls and a vertical channel is mounted on that end of the arm on the throw toward the rolls, the solid abrasive is elongated and slideable vertically in said channel, and the clamping means holds the stone at a selected position in the channel.

5. In combination with a machine for finishing a raceway on a ring having two parallel, transversely aligned rolls lying in a horizontal plane with means for rotating said rolls at the same speed, and a positioning carriage movable horizontally between a position adjacent the rolls and a spaced position, a finishing head mounted on the positioning carriage, frame members mounted on the finishing head projecting toward the rolls and spaced by a distance greater than the rolls so that upon a movement of the positioning carriage toward the rolls the frame member will straddle the rolls, aligned bearings in said frame members, one in each frame member, a crank having a journal in each end rotatably disposed in said bearings and having a throw positioned away from the rolls, an arm mounted on the throw extending forwardly toward the axis of the bearings, a channel mounted on the end of the throw at right angles to the line of movement of the positioning carriage, an opening into the channel, a clamp positioned in said opening, said clamp being mounted on a pin extending rearwardly of the arm, a spring urging the clamping member into the channel, and a stop mounted on the positioning carriage in alignment with the arm whereby on a movement of the positioning carriage away from the rolls, the end of the pin will engage the stop and withdraw the clamp from the channel.

6. The combination of claim 5 together with a spring engaging the upper end of the abrasive and urging it downwardly.

7. A machine for finishing a raceway on a ring comprising means for rotating a ring, means for engaging and oscillating in and normal to the raceway of a ring a solid abrasive having one surface contoured to the raceway of the ring, means for disengaging the abrasive from the ring, and means for resetting the abrasive in its holder after each finishing operation.

8. A machine for finishing a raceway on a ring comprising means for rotating a ring, a positioning carriage reciprocatable toward and away from the means for rotating the ring, an abrasive holder, a solid abrasive having one end contoured to the raceway of a ring mounted in the holder, means for oscillating the contoured end of the abrasive in the raceway of a ring engaging the rotating means, a gauge having a segment contoured to that of the ring raceway mounted in fixed relationship to the rolls, and means for seating the contoured end of the abrasive in the gauge and resetting the abrasive in its holder after each functioning of the oscillating means.

9. A machine for finishing a raceway on a ring comprising means for rotating a ring, a positioning carriage, an abrasive holder mounted on the positioning carriage and of a size less than the diameter of the ring to be worked, a solid abrasive having one end contoured to the raceway of a ring mounted in the holder, means for moving the positioning carriage from a work position adjacent the rotating means and a gauge position spaced therefrom, a gauge having a surface contoured to the surface of a ring raceway mounted in the gauge position, means on the back stroke of the positioning carriage for positioning the contoured surface of the abrasive adjacent the complemental surface of the gauge, means for releasing the abrasive from the holder, means for pressing the abrasive into the gauge, and means for again clamping the abrasive in the holder.

10. The machine of claim 9 wherein the gauge is mounted on an arm pivoted on the positioning carriage together with means for moving the gauge from the gauge position immediately after the abrasive has been reclamped.

11. A machine for finishing a raceway on a ring comprising a frame, two parallel, transversely aligned rolls lying in a horizontal plane mounted on the frame, means for rotating said rolls at selected speeds, a positioning carriage mounted on the frame and reciprocatable along a line parallel to the axes of the rolls toward and away from the same ends of said rolls, an abrasive holder mounted on said positioning carriage, an elongated, solid abrasive vertically disposed in said holder, a clamp releasably holding said abrasive in the holder, a spring urging the abrasive downwardly, means for oscillating the holder on an axis at right angles to the line of movement of the positioning carriage and passing through the abrasive, a gauge having a surface contoured to that of the raceway to be worked positioned in exact horizontal alignment with a segment of a ring to be worked when resting on the rolls, means for engaging the abrasive in the raceway on the forward position of the positioning carriage, and means for positioning the abrasive at the end of the back stroke of the carriage adjacent the gauge, means for releasing the abrasive from the holder whereby the spring presses the abrasive into the gauge, and means for reclamping the abrasive in its holder.

12. A machine for finishing a raceway on a ring having spaced, circumferential surfaces comprising a frame, two spaced, parallel, transversely aligned, horizontal, cylindrical rolls mounted on said frame, means for rotating said rolls at a selected speed, means for finishing a ring raceway mounted on said frame, means for moving said finishing means from a position adjacent one end of said rolls to a position adjacent the side of said rolls, and means for resting a raceway on said rolls, said means comprising a feeder having an upwardly open semi-circular recess for holding a ring upright, and means for grasping a ring so held in said feeder in vertical position and moving it onto the rolls so that it rests edgewise freely on the rolls at a position accessible to the finishing means.

13. The machine of claim 12 wherein the means for moving the ring from the feeder to the rolls comprises a pair of clamping arms, a wear plate on each arm having a semicircular surface complementary to the external configuration of a ring, said wear plates being yieldably pressed toward each other, means for pressing the wear plates over a ring in the recess of the feeder, means for moving said arms to a position over and adjacent to the rolls, and means for spreading said arms to release the ring on the rolls.

14. The machine of claim 13 wherein the upper ends of the arms are pivotally mounted on a shaft parallel to the axes of the rolls and the semi-circular recess of the feeder is in lateral, parallel alignment with that portion of the rolls where a ring rests for finishing.

15. The machine of claim 13 together with means for pushing a ring off the rolls.

16. A machine for finishing a raceway on a ring comprising a frame, two spaced, parallel, transversely aligned, cylindrical rolls mounted on said frame, means for rotating said rolls at a selected speed, means for finishing a ring raceway mounted on said frame, means for moving said finishing means from a position adjacent one end of said rolls to a work position adjacent the side of said rolls and equidistant therefrom, and means for altering the spacing of the two rolls from each other while maintaining each at an equal distance from the work position of the finishing means.

17. The machine of claim 16 wherein the spacing means is a guideway mounted on the frame parallel to the plane containing the axes of the two rolls, each roll is mounted on a block slideable in the guideway equal distant from the finishing means, and means for simultaneously moving both blocks toward or away from the finishing means in the work position while maintaining the blocks equidistant from the finishing means.

18. The machine of claim 17 wherein the axes of the rolls are in a horizontal plane and the guideway on the frame is in a parallel, horizontal plane.

19. A machine for finishing internal and external raceways on rings comprising a frame, a pair of parallel, transversely aligned, like rolls mounted in a horizontal plane on said frame, means for rotating said rolls in the same direction, means for positioning successively rings on said rolls, a base carriage mounted on said frame at one side of said rolls, a positioning carriage mounted on said base carriage and reciprocatable along a horizontal path toward said rolls, finishing means mounted on the positioning carriage, and means for raising the base carriage to a level such that upon moving the positioning carriage toward the rolls, the finishing means may be either at a level above the bottom of an internal raceway or above the top of an external raceway of a ring.

20. The machine of claim 19 wherein a slide carriage is mounted on the base carriage and is movable with respect thereto away from the rolls.

21. A machine for finishing raceways on rings comprising a frame, two parallel spaced rolls lying in a horizontal plane mounted on said frame, means for rotating said rolls at selected speeds, a positioning carriage mounted on the frame and reciprocatable toward and away from the ends of the rolls, a finishing means mounted on the end of the positioning carriage adjacent the rolls, means for oscillating the polishing means in a plane parallel to the axes of the rolls, a piston chamber and rod drivingly connected to said positioning carriage, feed means for successively positioning rings upright on the rolls, means for removing a ring positioned on said rolls, and mechanical linkage connecting the rod to the feed means and the removing means for actuating the feed means and removing means at selected times.

22. The method of automatically finishing sequentially like rings each having a ground circular raceway, which comprises the steps of; pivotally oscillating an abrasive in engagement with a raceway of a ring in a plane passing through the axis of the ring and said abrasive pivoting about a pivot axis being spaced from the raceway by a distance exactly equaling the radius of a ball to be used in the raceway for a work period, and repositioning the abrasive relative to its pivot axis to equal said radius after each work period.

23. The method of automatically finishing sequentially like rings each having a ground circular raceway, which comprises the steps of; pivotally oscillating an abrasive in engagement with a raceway of a ring in a plane passing through the axis of the ring and said abrasive pivoting about a pivot axis being spaced from the raceway by a distance exactly equaling the radius of a ball to be used in the raceway for a work period, removing the abrasive from the raceway at the end of the work period, repositioning the abrasive at said radius from said pivot axis while removed from the raceway, of replacing the first ring with a second ring, and pivotally oscillating the abrasive in the raceway of the second ring.

References Cited in the file of this patent

UNITED STATES PATENTS

| | | |
|---|---|---|
| 1,914,647 | Raule | June 20, 1933 |
| 1,917,468 | Steiner et al. | July 11, 1933 |
| 1,921,039 | Remington | Aug. 8, 1933 |
| 2,184,640 | Foster et al. | Dec. 26, 1939 |
| 2,206,842 | Indge | July 2, 1940 |
| 2,244,806 | Schmidt | June 10, 1941 |
| 2,276,611 | Connor | Mar. 17, 1942 |
| 2,398,022 | Marren | Apr. 9, 1946 |
| 2,435,565 | Bautz | Feb. 10, 1948 |